Sept. 16, 1969      J. E. KILLPATRICK      3,467,472
RANDOM BIAS FOR LASER ANGULAR RATE SENSOR
Filed Dec. 5, 1966
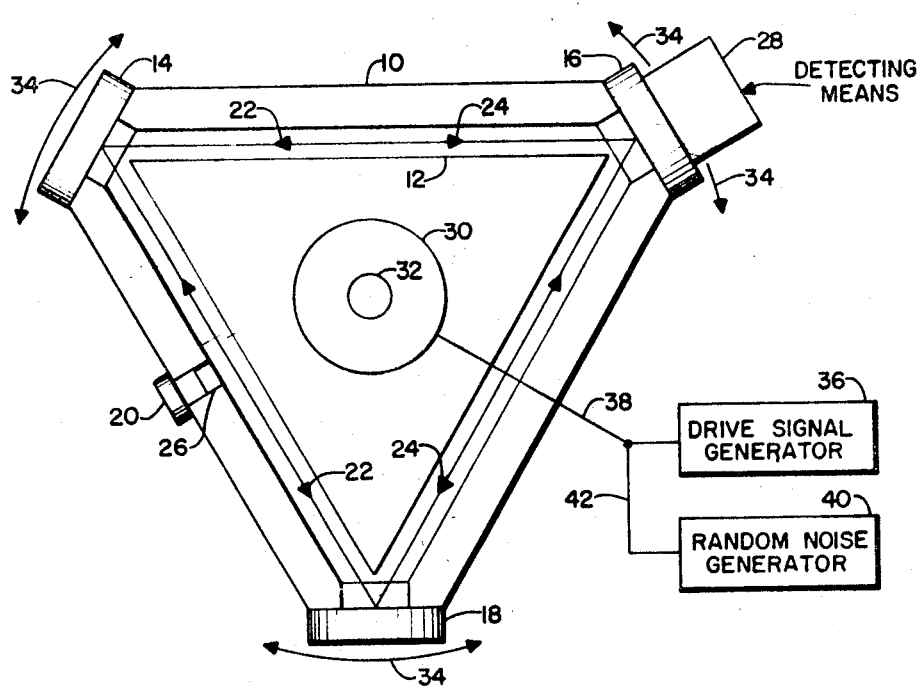
INVENTOR.
JOSEPH E. KILLPATRICK
BY Charles J. Ungemach
ATTORNEY United States Patent Office 3,467,472
Patented Sept. 16, 1969

3,467,472
RANDOM BIAS FOR LASER ANGULAR
RATE SENSOR
Joseph E. Killpatrick, Minneapolis, Minn., assignor to
Honeywell Inc., Minneapolis, Minn., a corporation of
Delaware
Filed Dec. 5 1966, Ser. No. 599,265
Int. Cl. G01b 9/02; H01s 3/00
U.S. Cl. 356—106               4 Claims The present invention relates to apparatus and techniques for preventing frequency coupling in devices which compare the frequencies of two counter rotating beams of light as a measure of rotation. More particularly this invention relates to an improvement to the laser angular rate sensor apparatus described and claimed in co-pending application Ser. No. 445,171, now U.S. Patent No. 3,373,650, in the name of Joseph E. Killpatrick also assigned to the present assignee.

In a laser angular rate sensor, two monochromatic beams of light are generated in opposite directions about a closed-loop path which encloses the axis of rotation about which the rate is to be sensed. Rotation of the apparatus about this axis causes an effective path length change for each beam, and thus, produces a frequency difference between the two beams since the frequency of oscillation of a laser is dependent upon the length of the lasing path. The magnitude and sign of this difference in frequency are indicative of the rate and direction of rotation and, consequently, may be monitored for that purpose as described in the above referenced co-pending application.

A difficulty arises at low rotational rates. The difference in frequency between the two beams is small at low rates and it has been found that the beams tend to resonate together or "lock-in" so that the two beams oscillate at only one frequency. Thus, it becomes difficult to read low rotational rates because the frequency difference proportional to the rotation rate does not exist at the low rates. The above referenced application teaches a method by which this problem may be avoided.

In the above referenced application the sensing apparatus is electrically or mechanically oscillated so that the beams seem to be rotating at a rate higher than the lock-in rate for a majority of the time. The times when the beams are below the lock-in rate (at the extremities of the oscillation) are very short intervals, and, consequently, the total amount of lock-in is greatly reduced. However, this oscillation biasing does not completely eliminate the effects of lock-in since a small amount of lock-in occurs at the extremities of each oscillation. These short periods of lock-in cause errors in the output signal which are cumulative and in time can amount to a bothersome level.

The present invention seeks to eliminate this error by additionally randomizing the bias so that these small errors that occur at the extremities of the oscillation are no longer cumulative. Accordingly, it is an object of the present invention to provide apparatus in addition to that described in the above referenced co-pending application to further reduce the effects of lock-in in a laser angular rate sensor.

Further objects and advantages will become apparent in the following description and drawing in which a schematic diagram of one possible embodiment of my invention is shown.

In the drawing a support means 10 is shown which may be, for example, a solid piece of quartz. Support means 10 is generally triangular in shape and contains a triangular tunnel 12 therein. Tunnel 12 is sealed from the outside by means of a group of mirrors 14, 16, and 18 and a plug 20. Mirrors 14, 16, and 18 are bonded to support means 10 so as to form a three cornered, triangular, closed-loop path about which two counter rotating beams of laser light may be reflected. These beams are indicated by a pair of arrows 22 and 24. A suitable lasing gas is introduced into the triangular tunnel 12 through a hole 26. Plug 20 is then inserted so as to seal tunnel 12. A suitable exciting apparatus may be used to cause the lasing gas to lase, which apparatus is not shown in the drawing but may be constructed according to principles well known to those skilled in the art. The laser beams travel in opposite directions about the triangular closed loop path. Rotation of the apparatus about an axis through the plane of the paper will cause a frequency difference between the two counter rotating beams because the beam traveling in the same direction as the rotation will be presented with an effectively longer path than the beam traveling opposite to the rotation and the oscillation frequency of a laser is dependent on the path length. Portions of the two beams are allowed to pass through mirror 16 to a detecting means 28. Detecting means 28 operates to measure the frequency difference between the two beams and, thereby, sense the rotation of the apparatus. Detecting means 28 may be the same as that disclosed in the above referenced co-pending application. At low rotational rates the two counter rotating beams indicated by arrows 22 and 24 have frequencies which are not too different. As a result they tend to resonate together or lock-in so that low rotational rates may not be measured. To avoid this the entire support means 10 may be mounted on top of a vibrating means 30 by means of a shaft 32. Vibrating means 30, which could be, for example, a motor, operates to rotationally vibrate the support means 10 as shown by a set of arrows 34. Motor 30 vibrates the support means 10 in accordance with a signal supplied by a drive signal generator 36 through an electrical connection 38. This rotation causes the two counter rotating beams to have substantially different frequencies for a majority of the time thus avoiding lock-in for a majority of the time. All of the apparatus described to this point is explained and described in the above referenced co-pending application. A more complete and detailed explanation may be had by reference to that application.

As mentioned earlier this biasing apparatus does not completely eliminate the effects of lock-in. As the apparatus vibrates back and forth it must momentarily come to a stop at the extremities of its oscillation. During these brief moments lock-in occurs and over a long period of time these successive short intervals of lock-in are cumulative and add up to a bothersome error. The present invention contemplates the addition of a random noise generator 40 to the apparatus shown, to introduce random noise to the drive signal by means of an electrical connection 42. It has been found experimentally that such a modification causes these short intervals of lock-in to be randomized so that they no longer add in a cumulative fashion. A significant improvement in the accuracy of the device results.

It should be understood that various modifications and variations may be made to the apparatus disclosed. For example, reference to the above mentioned co-pending application will show that mechanical vibration is not the only method of biasing a laser angular rate sensor. One alternative is to place a Faraday type of material into the path of the laser beams in conjunction with a pair of quarterwave plates to optically bias the beams. This type of biasing apparatus is also completely described in the co-pending Killpatrick application and it is clear that the addition of a random bias as in the present invention is equally applicable to this type of embodiment. The addition of a random noise bias to any biasing system of this type will be constructive.

I claim:

1. In a device wherein two beams of substantially monochromatic light are generated along a closed-loop path in opposite directions and the frequency difference between the two beams is determined as a measure of rotation thereof, apparatus to avoid lock-in of the two beams of light comprising:

means for biasing the beams of light to different frequencies;

means for causing the direction of the bias to periodically reverse; and means for randomizing the bias so as to randomize the effects of lock-in during the period of time in which said bias is reversing.

2. The apparatus of claim 1 in which said means for randomizing comprises a random noise generator connected to said means for biasing the beams.

3. Apparatus of the class described comprising in combination:

means supporting two counter rotating beams of substantially monochromatic light along a closed-loop path about an axis, a difference in frequency between said two beams being indicative of rotation of the supporting means about said axis;

means for measuring the frequency difference between said two beams;

means for sinusoidally vibrating said supporting means in a rotational mode about said axis so as to create a difference in frequency between the two beams for a majority of the time so as to prevent lock-in for a majority of the time; and means connected to said vibrating means for adding a random noise vibration to the sinusoidal vibration so as to randomize the effects of lock-in during the time in which lock-in is not prevented.

4. The apparatus of claim 3 in which said means for sinusoidally vibrating said supporting means comprises an electromechanically device driven in accordance with a sinusoidal electrical signal, which signal is supplied by a signal generator; and said means for adding a random noise vibration comprises a random noise generator connected to said signal generator.

References Cited

UNITED STATES PATENTS 3,373,650   3/1968   Killpatrick.

RONALD L. WIBERT, Primary Examiner

E. BAUER, Assistant Examiner

U.S. Cl. X.R.

331—94.5